(12) United States Patent
Giles

(10) Patent No.: US 6,477,386 B1
(45) Date of Patent: Nov. 5, 2002

(54) SYSTEM FOR AUTOMATIC METER READING

(75) Inventor: Terence George Giles, Purley (GB)

(73) Assignee: Advanced Technology Ramar Limited, Dorset (GB)

( * ) Notice: Subject to any disclaimer, the term of this patent is extended or adjusted under 35 U.S.C. 154(b) by 0 days.

(21) Appl. No.: 09/552,875

(22) Filed: Apr. 20, 2000

(30) Foreign Application Priority Data

Apr. 20, 1999 (GB) ............................................ 9909036

(51) Int. Cl.[7] ................................................ H04Q 7/00
(52) U.S. Cl. .................... 455/517; 455/88; 340/870.03; 340/870.15
(58) Field of Search .............................. 455/39, 41, 46, 455/67.1, 68, 88, 108, 109, 517, 507; 340/870.01, 870.02, 870.03, 870.11, 870.15

(56) References Cited

U.S. PATENT DOCUMENTS 5,438,329 A * 8/1995 Gastouniotis .......... 340/870.03
5,734,639 A * 3/1998 Bustamante ................ 455/517

FOREIGN PATENT DOCUMENTS

WO    WO95/30217    11/1995

* cited by examiner

*Primary Examiner*—Thanh Le
(74) *Attorney, Agent, or Firm*—Collard & Roe, P.C.

(57) ABSTRACT

A fixed network AMR system that has a range from the meter (4) to the node (6) of up to 5 km uses a common reference source (2) for the frequency reference of the meter transmitter (12) and the system receiver (18). By using a publicly available reference frequency the necessary frequency stability can be obtained in order to provide a signal to noise bandwidth of the order of 32 Hz.

4 Claims, 3 Drawing Sheets

SYSTEM FOR AUTOMATIC METER READING

BACKGROUND OF THE INVENTION

1. Field of the Invention

The present invention relates to Automatic Meter Reading (AMR).

2. The Prior Art

AMR systems fall into two types. There are systems that are designed to provide the readings on demand and fixed infrastructure systems. In "on demand systems" a meter is interrogated with a hand-held computer, a passing vehicle or from fixed network system. In each case the responses are obtained within a few seconds of the request. Clearly, this is essential with hand-held and mobile systems that need to complete the transaction while still in the vicinity of the meter.

In AMR fixed infrastructure systems, the data is sent to and received from neighborhood "nodes". The path between the nodes and the meters is available continuously. Therefore, quick communication is less important. On demand readings can be provided with fixed infrastructure systems. However, this is usually a matter of operational convenience, such as the ability to read a consumer's meter while speaking to them on the telephone. An historical database showing the consumer's consumption over the previous few days could provide the same customer service. In general, for billing purposes, a reading or set of readings received once per day for each meter is all that is essential for accurate billing.

Technical Problems
One Way/Two Way Operation

Mobile AMR systems have to send some sort of wake up or interrogate signal to the meter to request the reading. This means that such systems always need a two-way radio system. This requires a transmitter and receiver at both the meter and the node.

The perceived advantage of two-way systems is the ability to send data to the meter. In practice, this data is usually simply clock signals to update the internal clock in the meter to ensure that readings are taken at the right time. Other operational requirements like altering the tariffs can be achieved by post processing operations on the received data, provided that sufficient accurately timed readings are available. Two-way communications can also provide information to the consumer such as the fact that the billing tariff has changed.

The present invention is primarily concerned with the use of fixed network AMR systems.

Range

A major cost and difficulty in installing fixed network AMR systems is finding suitable sites which can have the necessary antennae, phone lines and main power available for the nodes. In most parts of the world there are constraints on how much radio power can be used for the communication between the node and the meters. The use of high power is also expensive and complicated. In practice, with conventional narrow band radio techniques the range between the meter unit and the node is approximately a 1,000 m. This means that in a medium-sized town, say 5 km by 5 km, a minimum of 25 nodes would be required. Clearly it is desirable to reduce the number of nodes required. Doubling the range of each node would give a fourfold reduction in the number required. In this example the ideal situation would be to achieve slightly greater than 5 km range. In that case only one node would be needed for the whole town.

The range between the meter unit and the node cannot be increased by increasing the transmitted radiated power because that is limited by the licensing authorities. Therefore, the only method of increasing the range is by improving the receiver sensitivity. In free space the range of a radio system obeys the inverse square law. Therefore, to get five times the range an improvement in sensitivity of 25 times is needed. In an urban environment with the antenna relatively close to the ground, the relationship between range and sensitivity is a fourth power law.

Therefore, for five times range increase a $5^4$=625 times improvement in sensitivity is needed. In radio terms this is a 28 dB increase in receiver sensitivity.

Minor improvements in the receiver design, such as optimizing the noise figure, might give a few dB of improvement. This will not achieve the required result. Most modulation schemes in common use, such as AM, FM and PM need recovered signal to noise ratios in the range of 10 to 15 dB. It is unlikely that these could be improved to give the necessary sensitivity.

Another possibility is to reduce the receiver/noise bandwidth in order to give the required sensitivity improvement.

A conventional narrow band FSK radio system with a 4800 baud rate would probably have a signal/noise bandwidth of about 25 kHz. Improving this to 32 Hz would be necessary to provide the necessary improvement in sensitivity to achieve the target range of 5 km.

Reducing the bandwidth by this ratio also means the data rate needs to be slowed down by the same amount giving a data rate of 7.68 bits per second. A 128 bit message will now take nearly 17 seconds to send. For a fixed network AMR system this is not a serious problem. A full set of 48½ hourly readings each of 16 bits would still only take two minutes to transmit.

Frequency Stability

The problem with reducing the bandwidth is that the frequency stability needs to be increased so that the weak signal stays within the narrow channel. In the example above, a 32 Hz bandwidth requires a frequency stability of the order of 5 Hz. At a typical operating frequency of 184 MHz this means that the combined stability of the transmitter and receiver must be better than 0.027 ppm. This cannot be achieved with any existing oven controlled or temperature compensated crystal oscillator.

Techniques such as automatic frequency control (AFC) will not help because they require a sufficiently close "on-tune" so that there is enough energy from the wanted signal to drive the AFC detectors.

SUMMARY OF THE INVENTION

The present invention overcomes the technical problems of increasing meter to node range by eliminating the need to synchronize transmitter and receiver frequencies by exchanging data between them. Instead, the present invention uses a common frequency reference source for both transmitter and receiver. The common frequency reference source must be available at all meters and at the receiving node. In the UK there are a number of transmitters that could be used for this purpose. For example the MSF Rugby transmission on 60 kHz, the BBC 198 kHz transmitter at Droitwich and any local FM station which carries radio data service (RDS) or a local wide area paging transmitter.

Similar common reference source transmitters are also available elsewhere in the world. For example the LF/MF services from WWV in Boulder Colorado would be ideal for AMR applications in the USA.

The advantage of MSF, Droitwich, WWV or RDS is that these common reference sources already send time data information as part of their normal operation. The VHF FM RDS transmitters have the disadvantage that they are at VHF making the receiver and the decoder more expensive. The LF transmitters are simpler to receive, particularly for underground pit mounted meters. A low-cost microcontroller can be used for the decoding. The BBC. Droitwich transmitter is already used for providing control and timing for radio time switches used in the UK domestic electricity industry.

Advantages of the Invention

The provision of a fixed network AMR system with a significant range makes this a viable alternative to the on demand systems that have previously been thought essential. Previous techniques for increasing sensitivity in order to increase range have focused on solutions that cannot deliver the necessary improvement. By recognizing that a publicly available stable frequency transmitter can be used as a common reference source, the present invention offers an economic solution which still allows low cost transmitters to be used. The reduction in data rate is not a significant problem as it is still possible to provide an enhanced consumer service relative to that provided by personal meter reading. Similarly, the absence of two way communications can also be overcome as time data is available from the common reference source.

BRIEF DESCRIPTION OF THE DRAWINGS

In order that the invention may be well understood an embodiment thereof will now be described, by way of example only, with reference to the accompanying diagrammatic drawings, in which.

DETAILED DESCRIPTION OF PREFERRED EMBODIMENTS

Overview

Figure 1:
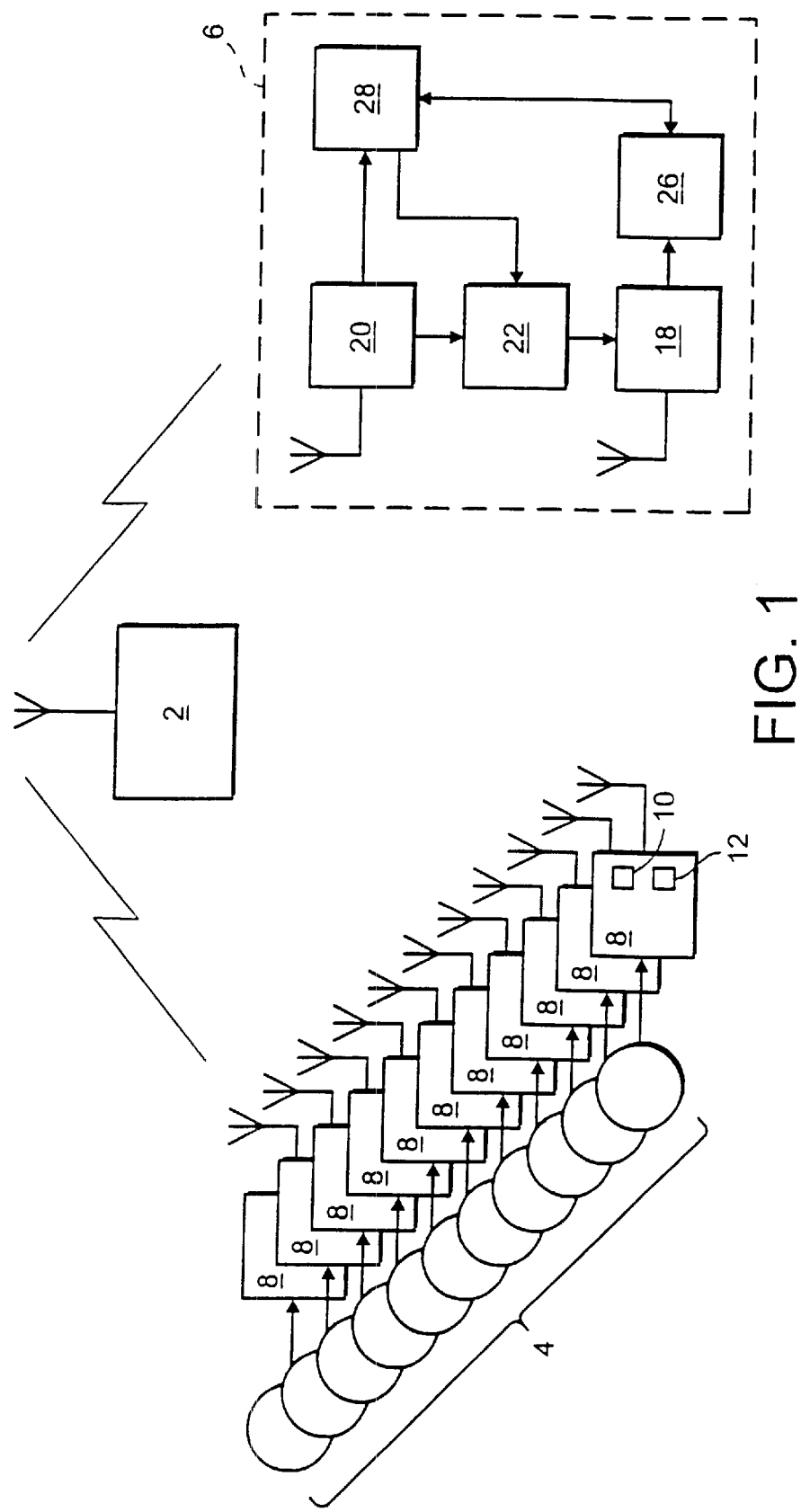
FIG. 1 shows a diagrammatic representation of a system in accordance with the present invention.

A common reference source transmitter station 2 is shown in FIG. 1. In a fixed AMR network a group of meters 4 is within range of a node 6. The station 2 may be a broadcast transmitter or an alternative type of common reference frequency source transmitter. The signal from transmitter station 2 must be available at all the meters 4 of the fixed network and at each of the nodes 6.

Each of the meters 4 has an interface unit 8. This unit 8 contains a simple reference receiver 10 and a transmitter 12 that is described in more detail with reference to FIG. 2 below.

The meter 4 generates data representing the units of, for example, water or energy consumed. This data is passed to the interface unit 8 where it is counted and stored in an internal register (not shown). In many applications a large number of registers will be needed so that a record of the units consumed in given periods of time can be maintained. For example it might be required to keep a record of the electricity consumed during every half-hour period. In this case forty-eight (48) registers would be needed for each day of storage. This would be appropriate if the interface unit sends data to its associated node 6 once per day. The common reference source transmitter 2 provides timing data to the interface unit 8 so that all the meters 4 change to the next register at the correct moment, such as on the hour or half-hour.

Each meter interface unit 8 is individually programmed to transmit on a certain frequency at a given time in such a way that none of the units 8 transmitting to the same node 6 will interfere with each other.

It will be appreciated that the nodes 6 will be distributed and interconnected in a hierarchical structure to cover a large area. Various network architectures for this purpose have already been described.

The transmitter station 2 provides a common frequency reference for all the meter transmitters and each node receiver 18. This ensures that there can be no frequency errors between any of the transmitters 12 in the meters and a receiver in node 6. If the time signal or the frequency of the reference station should drift, this would be of no consequence because there would still be no relative difference between any of the transmitters and the receiver.

The reference station 2 also provides an accurate time signal so that each one of the meter interface units 8 sends its message not only on the correct frequency but also at the correct time. In practice, the meter interface units 8 would have a simple low accuracy time reference such as a 32.768 kHz watch crystal running continuously which could be used to anticipate the transmission time and turn on the receiver 10 a few minutes early. The reference receiver 10 can then update the internal clock, provide the frequency reference during the transmission and then be switched off. In this way the power consumption of the reference receiver 10 at the meter can be saved. This is particularly significant for non-electricity utility meters such as water or gas meters.

Each node 6 includes a reference receiver 20 for receiving the reference signal from the reference station 2. This receiver 20 processes the common reference frequency signal and generates a standard frequency that is passed to a frequency synthesizer 22. This synthesizer 22 serves as an accurate local oscillator which is used to tune a VHF/UHF receiver 18 which receives the signals transmitted by the meter transmitters 12 in the meter interface units 8. Typically, this receiver 18 will be in the 184 MHz AMR band in the UK or the 868 MHz band in Europe or at 915 MHz in the USA.

The receiver 18 preferably has a very narrow bandwidth, in the order of a few tens of Hertz. Alternatively, the received signal may be converted down from VHF/UHF to a lower intermediate frequency (IF) where the narrow filter can be implemented in a digital signal processing (DSP) circuit or a digital system 26. The standard frequency generated by the local oscillator 22 is also used as the clock for the DSP or other filter 26 to ensure that it is also locked to the reference signal station 2.

A computer 28 is provided in the node 6. The computer 28 has to perform a number of functions. The computer 28 includes a look up table giving the exact time and frequency of the data messages due from the individual meter transmitters 12. When a message is anticipated, the computer 28 sends a command to the frequency synthesizer 22 to select the required radio channel in the VHF/UHF receiver 18. Other data may be sent by the computer 28 to the filter 26 to "fine tune" to the received signal by means of the DSP or other narrow filter 26. Once a message has been received and decoded it is stored ready to be passed to a billing system or for other processes within the utility.

Each meter interface unit 8 incorporates a low power microcontroller or application specific integrated circuit (ASIC) to collect the data from the meter 4 and provide timing and tuning information to the narrow band transmitter 12.

Detailed Description of a Preferred Meter Transmitter

Figure 2:
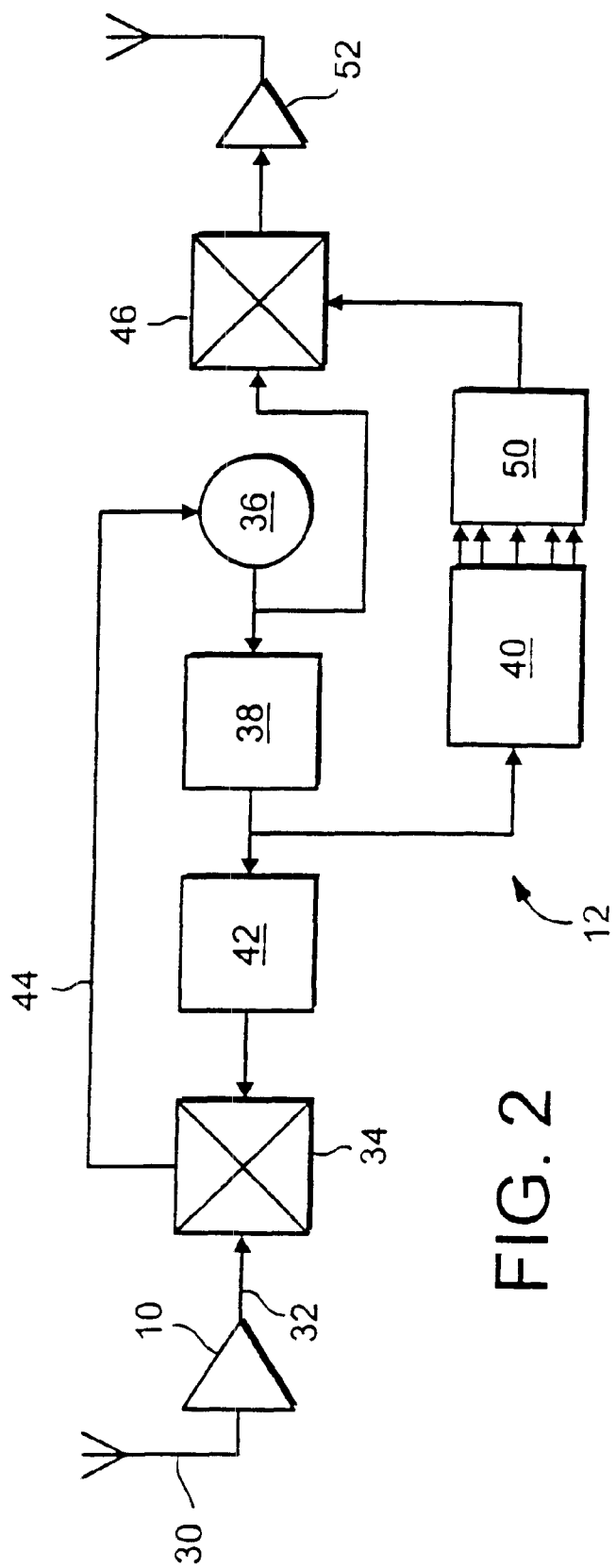
FIG. 2 shows one embodiment of a narrow band transmitter for use in a meter.

One embodiment of a meter transmitter 12 is shown in FIG. 2. For the purposes of this example only, it will be assumed that the common reference frequency source transmitter 2 is the BBC radio station on 198 kHz. An aerial 30 is connected to the receiver 10 which includes an amplifier, limiter and filter to process the received signal to give a stable 198 kHz reference signal at its output 32. A phase detector 34 receives the output reference signal on line 32. A phase locked loop (PLL) is provided which incorporates a voltage controlled oscillator (VCO) 36, which is tuned to 184.140 Mhz in this example. The VCO 36 receives a control input from an output 44 of the phase detector 34. The output of the VCO 36 is fed first to a divider 38, which divides the signal by a factor of 10 to provide an 18.414 Mhz clock to a microcontroller 40 and also an input to a further divider 42 which divides the output signal by a factor of 93 to give a 198 kHz signal which is applied to a second input of the phase detector 34. The output signal from the phase detector on line 44 completes the phase locked loop by controlling the frequency of the VCO 36 in order to pull the VCO frequency to an exact multiple (in this case 930) of the reference frequency.

It will be appreciated that other frequencies for the VCO can be obtained by using different division ratios in dividers 38 and 42. It is also possible to include additional dividers between the receiver 10 and the phase detector 34. The output of the VCO is passed into a balanced mixer 46. The mixer 46 also receives an input from a digital to analogue converter (DAC) 50, which is driven by the microcontroller 40. The DAC 50 receives data to be transmitted from the interface unit 8 as stored in registers previously described. The mixer 46 generates a double sideband amplitude modulation (DSB) with a suppressed carrier signal at the VCO 36 frequency. The modulation components are created by the combination of the microcontroller software and the DAC 50.

Figure 3:
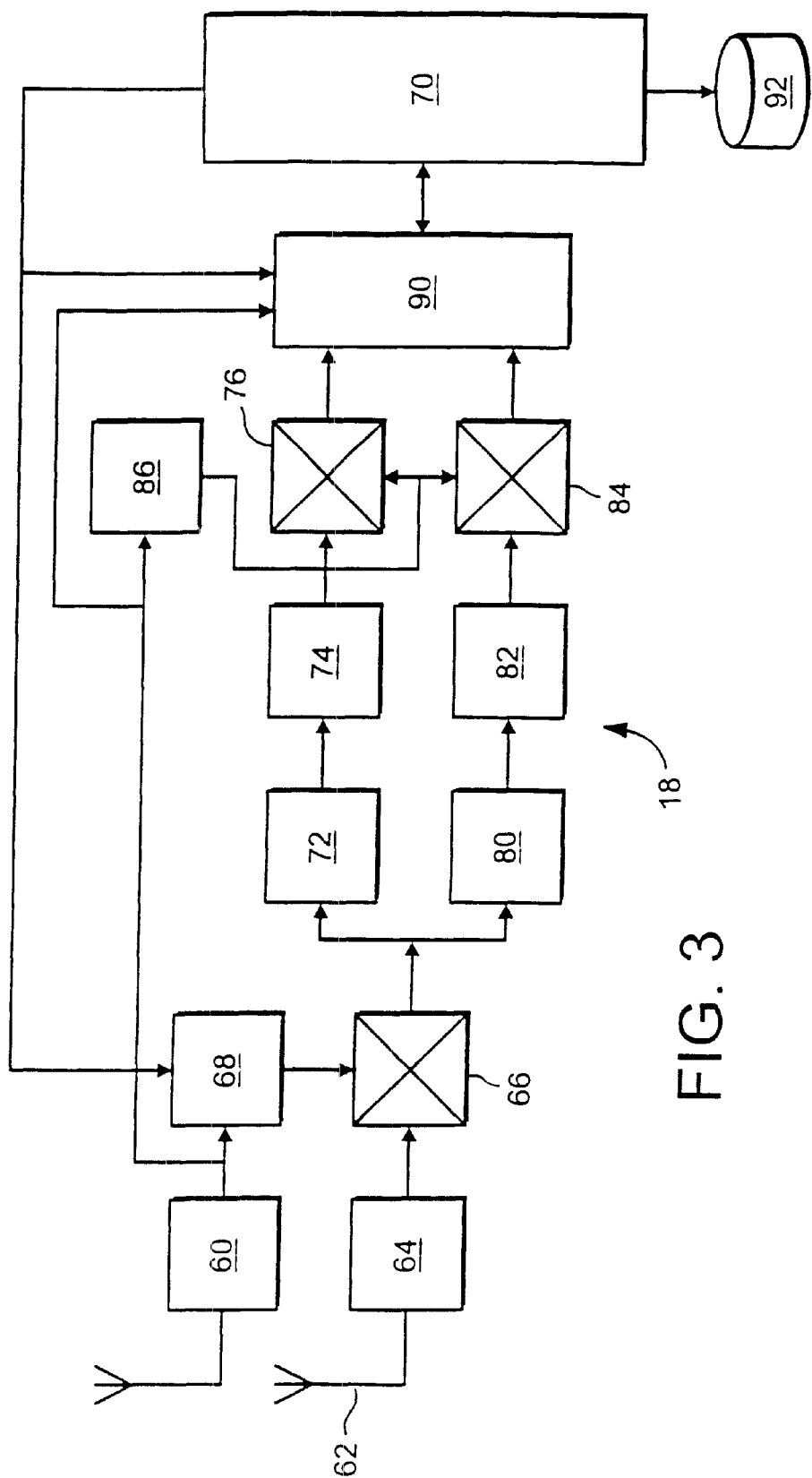
FIG. 3 shows one embodiment of a receiver for use in a node.

In the embodiment described, it is proposed that the node receiver described in more detail with reference to FIG. 3 be an independent sideband receiver so that a variety of modulation types can be used. For example, the microcontroller could be used to generate simple frequency shift keyed modulation or slightly better performance could be achieved by using a cosine shaped DPSK tone.

The output of the mixer 46 is fed to amplifier 52 and then to an aerial 54. Typical power levels for this transmission would be 100 mW peak envelope power (PEP).

It will be appreciated that other designs of transmitter may a be used in place of the scheme described. For example, instead of the single mixer 46, a quadrature modulator could be used. This is a more expensive alternative, as it requires two mixers and 90° phase splitters for the carrier and modulation. The single mixer solution described allows cost savings at the meter interface unit 8 but does mean that the node receiver 18 needs to be more complex. However, this cost is small when shared between all the meters in a network.

Another advantage of the double-sideband technique with an independent sideband receiver is that it provides a small level of frequency diversity that should help the performance of the system in multi-path propagation conditions and with other narrow band interference.

Detailed Description of a Preferred Node Receiver

A receiver 18 for use at a node 6 is described with reference to FIG. 3. In the proposed system, the node receiver 18 will pick up the DSB signal from the meter transmitter and process it as two separate side bands, each with a very narrow bandwidth. The separate side bands will contain identical data that can either be processed independently to give some protection against interference, or they can be combined in a final DSP filter to give the optimum sensitivity.

The node receiver 18 includes a receiver 60 for receiving the signal transmitted by the common reference source transmitter 2. This is the same signal as that received by the meter interface unit 8 and it provides a stable frequency reference for all the conversion oscillators and processor clocks within the receiver 18. The transmissions from the meter interface unit transmitters are received by antenna 62. These received signals are passed to an RF amplifier 64 and then to a mixer 66. A frequency synthesizer 68 which receives the off-air reference signal from receiver 60 provides the other input to mixer 66. In practice it may be necessary to use two or more mixers to get the required image rejection. Each such mixer will require a separate synthesizer local oscillator locked to the common frequency source reference standard.

The frequency synthesizer 68 may be a simple indirect PLL synthesizer or a direct digital synthesizer (DDS). A main processor 70 controls the operation of the entire receiver 18 and also initially sets the frequency of synthesizer 68 prior to lock with the reference source.

The output from the mixer 66 is split and passed through upper and lower sideband channels. The upper sideband channel comprises a filter 72, an amplifier 74 and a mixer 76. The lower sideband channel comprises a filter 80 supplying an amplifier 82 and a mixer 84. The filters 72, 80 could be standard voice SSB filters with pass bands 300 to 3000 Hz above and below the nominal IF carrier frequency. The two IF amplifiers 74, 82 then amplify the filtered signals. The mixers 76, 84 act as product detectors and convert the IF signal down to the original audio frequency baseband. The other inputs to the mixers 76, 84 are fed from a local synthesizer 86. This synthesizer is supplied by the common reference frequency source signal from receiver 60.

A digital signal processor (DSP) 90 receives the outputs of the mixers 76,84 from the upper and lower sideband channels and also inputs from the common reference frequency source receiver 60 and the main processor 70. The DSP 90 provides further filtering and combining steps. This DSP system will create the very narrow band width needed to achieve the system performance. The DSP 90 clock also comes from the common reference frequency source to ensure that it is correctly tuned to the modulation frequency generated in the meter interface units 8. The output of the DSP 90 is the decoded message, which is supplied to the main processor 70 for storage in any conventional manner such as the disk 92 before being sent to the office of a utility company for billing purposes. The processor 70 also sends commands to the main synthesizer 68 and the DSP filters 90 to ensure that the DSP 90 selects a correct radio channel and modulation frequency for the anticipated meter transmission.

Data to the Meter or Consumer

It is also possible to arrange for the node 6 to transmit data to the meter interface units 8 and possibly to a consumer by means of a local display on the meter. For such applications, the choice of reference stations becomes more difficult. In the UK, the 198 kHz BBC transmitter has a small number of very slow data channels available and the reference receiver in the meter interface unit 8 could easily decode these. The information can then be used to change the tariffs etc of all the meters in the system or perhaps change the transmission frequency or time slot of a particular meter transmitter.

In other parts of the world local VHF/FM transmitters could be used with the time code coming from the RDS data channel and meter data on a another sub-carrier in the same way as those used to send differential global positioning information.

Accordingly, while a few embodiments of the present invention have been shown and described, it is to be understood that many changes and modifications may be made thereunto without departing from the spirit and scope of the invention as defined in the appended claims.

What is claimed is:

1. A fixed network AMR system comprising a plurality of meters and nodes, each meter having a transmitter for transmitting data to at least one node, each node having a data receiver for receiving transmissions from meters within range of the node, wherein each meter and each node has a local oscillator and a reference receiver for receiving a common frequency reference signal as transmitted by a public source, said common signal providing a reference frequency for the local oscillators used by the meter data transmitters and the node data receivers.

2. A fixed network AMR system as claimed in claim 1, in which the common reference signal transmitted by the public source incorporates time data, wherein each meter and node has a clock and the reference receivers at the meters and nodes are adapted to receive said time data in order to synchronize the clocks in the meter and node.

3. A fixed network AMR system, as claimed in claim 1, wherein the meter transmitters generate a double sideband amplitude modulated signal with a suppressed carrier signal.

4. A fixed network AMR system as claimed in claim 1, wherein the node data receiver comprises an independent sideband receiver.

* * * * *